United States Patent [19]

Lewis

[11] 4,453,822

[45] Jun. 12, 1984

[54] APPARATUS FOR PRODUCING MICROFORM RECORDS FROM MULTIPLE DATA SOURCES

[75] Inventor: Gary D. Lewis, St. Clairs Shores, Mich.

[73] Assignee: Energy Conversion Devices, Inc., Troy, Mich.

[21] Appl. No.: 98,388

[22] Filed: Nov. 29, 1979

[51] Int. Cl.³ .................. G03B 27/52; G03B 27/70
[52] U.S. Cl. .................................. 355/43; 354/77; 355/45; 355/54
[58] Field of Search ................. 355/19, 43, 20, 54; 354/75–77

[56] References Cited

U.S. PATENT DOCUMENTS

| | | | |
|---|---|---|---|
| 3,966,317 | 6/1976 | Wacks et al. | 355/19 |
| 4,067,650 | 1/1978 | Spence-Bate | 355/20 |
| 4,068,941 | 1/1978 | Spence-Bate | 355/20 X |
| 4,074,935 | 2/1978 | Spence-Bate | 355/20 X |
| 4,123,157 | 10/1978 | Klose et al. | 355/19 X |

*Primary Examiner*—Richard A. Wintercorn
*Attorney, Agent, or Firm*—Lawrence G. Norris

[57] ABSTRACT

Apparatus for producing microform records from various image sources, such as hard copy or cathode ray tube images fed from various data sources, includes an image-reducing projection system into which is selectively directed light reflected from hard copy or light preferably from the face of a cathode ray tube to which white background CRT image-forming signals are fed from any one of a number of selectable data sources. The reduced image involved is preferably applied first to a non-archival heat developable mask-forming film, like a dry silver film, and then the image on this film is transferred preferably to an archival film capable of later receiving additional data on unused portions thereof and most advantageously arranged as a microfiche card. The cathode ray tube face is preferably positioned immediately below a platform-containing or receiving image field area. The platform normally is adapted to receive hard copy thereupon. Manual controls are provided for setting-up the apparatus for producing microform records of either hard copy or cathode ray tube face images. In the latter case, the platform, which is preferably white opaque, is moved away from the face of the cathode ray tube so that the light image thereon is directed up into the image-reducing projection system. Means are provided for determining exposure times for imaging upon the mask-forming film in accordance with the average background light intensity of the light reflecting from the hard copy or the background light on the cathode ray tube face, depending upon whether hard copy or cathode ray tube face microform imaging is desired by operation of the appropriate manual control.

27 Claims, 9 Drawing Figures

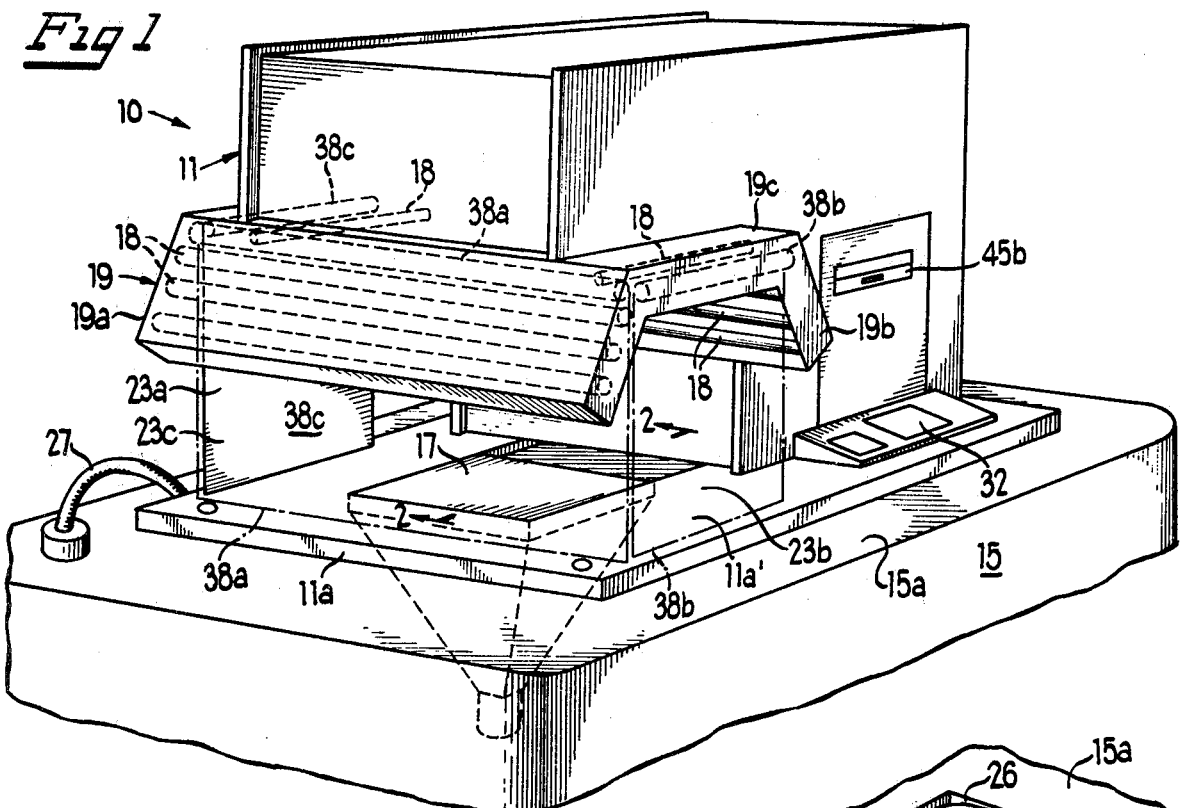
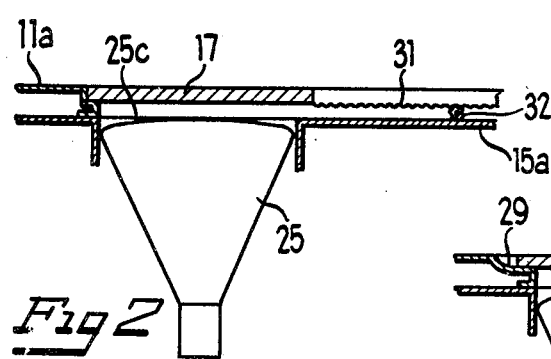
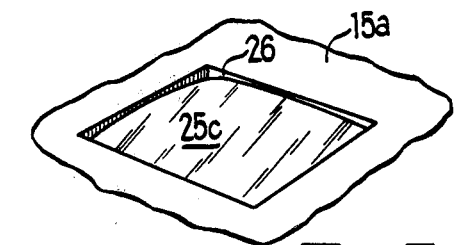
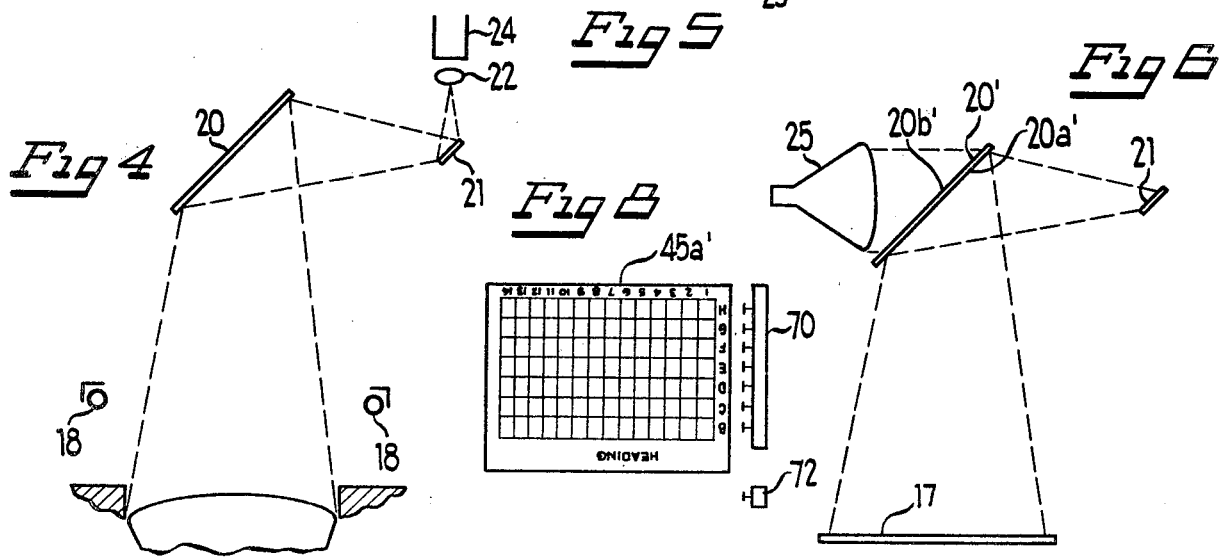

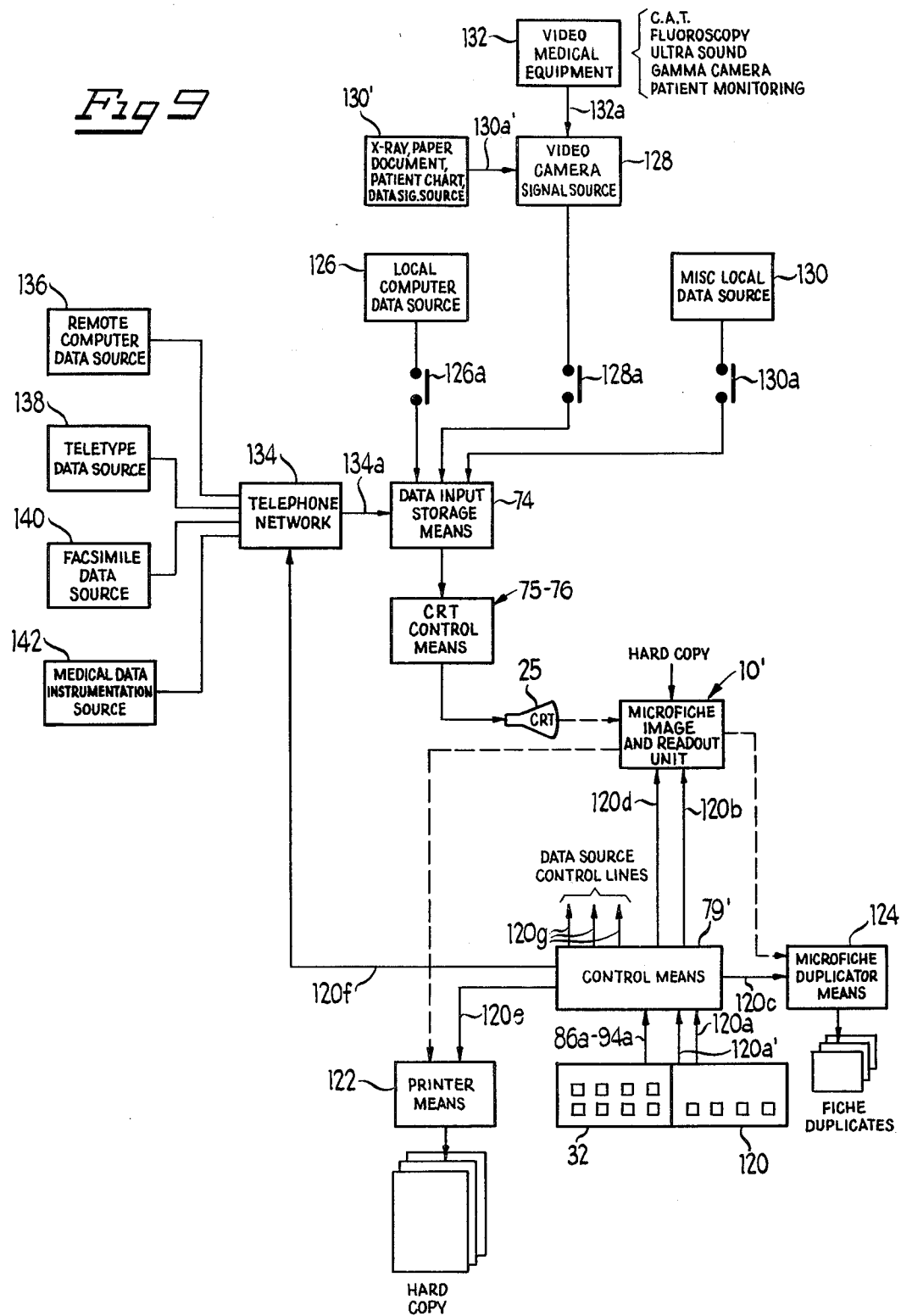

APPARATUS FOR PRODUCING MICROFORM RECORDS FROM MULTIPLE DATA SOURCES

BACKGROUND OF INVENTION

The present invention in one of its preferred forms relates to a dry-process apparatus for producing archival microform records from light reflecting hard copy, such as apparatus like that disclosed in U.S. Pat. Nos. 3,966,317 and 4,123,157, but modified so that it can also produce microform records from cathode ray tube face images (hereafter sometimes referred to as CRT images) constituting pages of desired data. The apparatus disclosed in these patents includes an imaging station with a hard copy-receiving platform, and wherein a light image reflected from the hard copy on the platform is reduced to micro-image size and applied to a non-archival dry-process mask-forming film strip which is photo-sensitive to and imaged by the light reflected from the hard copy. The imaged portion of the film strip is developed by heat to provide micro-imaged transparencies therein where the light preferably forms a dark opaque background for transparent data forming portion of the image produced therein. The apparatus also includes an image transferring station wherein the micro-image transparencies produced in the mask-forming film strip are transferred by radiant energy above a certain critical value passing therethrough to an initially opaque archival dry-process microfiche card-forming film which is not very sensitive to hard copy reflected light but is sensitive to and believed transparent without any developing procedure in those regions thereof struck by the radiant energy above the certain critical value. The final image thus produced is a negative of the original hard copy image and has archival properties. Since only the originally dark data portion of the original hard copy image affected the microfiche card-forming film, the film has add-on capabilities. The apparatus disclosed in said U.S. Pat. No. 4,123,157 includes features for enabling a previously partially imaged frame of the microfiche card-forming film to be moved into a projection position where the frame image is projected onto the platform so that an overlay piece of hard copy can be placed on the platform and positioned thereon to transfer data thereon to still unimaged portions of the microfiche frame involved.

It was not initially appreciated that the apparatus as disclosed in the aforesaid patents could be effectively used in recording information fed directly from cathode ray tube images. In the past, microform records have been made from computer data by using a computer data controlled laser beam scanning small areas of a recording film to provide micro-sized characters representing alpha-numeric and other data. However, laser beam scanning equipment designed for this purpose is relatively expensive, and because of OSHA restrictions are not presently useable in business offices and the like. Also, cathode ray tube images where the alpha-numeric data is directly formed by the lighted portions of the cathode ray tube screen have been reduced in size and applied to a film to form microform images thereon. The microform film used did not have add-on capabilities, and there was no particular thought given to the possible advantages of providing alpha-numeric data formed by back-lighted portions of the cathode ray tube screen which form dark alpha-numeric characters or other data.

SUMMARY OF THE INVENTION

In accordance with one of the features of the present invention, a selected source of data to be imaged on the face of a cathode ray tube is converted to electrical signals fed to the deflection and intensity control terminals of a cathode ray tube to form on the screen thereof alpha-numeric or other data from back lighted portions of the screen. The image produced on the cathode ray tube screen, in turn, is reduced by an image-reduction projection system to a size which will form a page of information on the frame of a microfiche card. This image-reducing projection system may be a mirror and lens system, like that shown in said U.S. Pat. No. 3,966,317 or 4,123,157 or, in the alternative, may be a bundle of tapering fiber-optic filaments encompassing the face of a cathode ray tube at one end thereof and occupying an area at the other end thereof which encompasses only a frame of a microfiche card.

In accordance with another aspect of the invention, an unusually flexible microform record-producing apparatus is provided which operates with a selection of data sources which generate data signals for producing data sheet images on the screen of the cathode ray tube. Also, there is also provided a hard copy-receiving station for receiving ordinary hard copy. Most advantageously, the same image-reducing projecting system is used for both the cathode ray tube and hard copy images. Such a dual-function apparatus can be exceedingly useful in producing business, scientific, and/or medical records in business, engineering and medical offices.

In this application of the invention, a control panel is provided which includes manually operable controls which can be selectively operated so that the apparatus can form microform records from light reflected hard copy or of the data displayed on the face of a cathode ray tube on a selected frame of the same or different microfiche cards. For example, in the most preferred form of this aspect of the invention, a horizontal preferably white opaque platform is moved automatically into a hard copy-receiving position below the image-reducing projection system when a hard copy record set-up control is operated. Exposure control means specifically designed for producing a properly exposed hard copy image on the aforesaid dry-process mask-forming film becomes operable to produce a satisfactory image of the hard copy when a hard copy record control is operated. In the most preferred form of the invention, a cathode ray tube is mounted so that its display face, which has approximately the same area as that of the largest image field which can be accommodated by the projection system, is upwardly directed into the projection system immediately below the space occupied by this platform when a hard copy image is to be made. When a CRT image is to be recorded, the opaque platform is removed preferably automatically from this space so that the image on the face of the cathode ray tube can be directed to the same image-reducing projection system used for making hard copy microform records. Also, exposure control means specifically designed for use with the CRT imaging operation becomes operative when the CRT mode of operation of the apparatus is selected. The exposure control means responsive to hard copy and CRT screen images are preferably means for controlling the length of time the image appears on the face of a cathode ray tube or the length of time fluorescent lamps or the like directed upon hard copy on the hard copy-receiving platform remain in a fully energized state, so that expensive shutter devices need not be used. In connection with the control of fluorescent lamps, it was unexpectedly discovered that the on and off times of such lamps can be instantaneously controlled, especially if the lamps are initially only energized by a low voltage where they do not produce any significant light (i.e. an insufficient amount to image the mask-forming film). When such lamps are suddenly applied with a relatively high energizing voltage they instantaneously turn on and they can be instantaneously turned off when the high voltage is disconnected therefrom. Alternatively, the exposure control means may control the developing times of the heat developed dry silver mask-forming film.

In accordance with another aspect of the invention, the CRT image microform recording operation can be either manually initiated or automatically initiated by the data signals so that spaced frames of information of the data involved can be produced on a microfiche card at locations determined by the data signals on successive frames or widely spaced frames of the microfiche card, or on manually selected frames thereof. Whenever an operator desires to make a microform record of a piece of hard copy while the apparatus of the invention is automatically making microform records of computer stored data, he operates controls calling for the set-up of the apparatus for a hard-copy microform recording operation. This results in the cessation of the further feeding of information from the computer of the cathode ray tube involved until a CRT microfiche image recording operation is again called for.

The above described and other features of the invention will be more completely described and more clearly understood upon making reference to the specification to follow and the drawings.

DESCRIPTION OF DRAWINGS

FIG. 1 is a perspective view of a self-contained microform image-producing unit and a support cabinet-containing a cathode ray tube which may be operated from data fed from a computer or the like to direct an image on the face thereof into the image-producing projection system of the self-contained unit;

FIG. 2 is an enlarged fragmentary vertical sectional view through the support base of the self-contained unit and the cathode ray tube-containing cabinet, and showing the relationship between a hard copy-receiving platform on the support base of the self-contained unit and the cathode ray tube mounted in the cabinet;

FIG. 3 illustrates the opening in the upper face of the cabinet top when the self-contained unit is removed therefrom, in which opening is exposed the face of a cathode ray tube;

FIG. 4 illustrates the light projection system comprising mirrors and a lens which is located within the self-contained unit shown in FIG. 1;

FIG. 5 illustrates a modified form of the invention wherein the hard copy-receiving platform is one which can be manually removed from a position above the face of the cathode ray tube when cathode ray tube imaging is desired;

FIG. 6 shows a further modified form of the invention wherein the cathode ray tube is located within a self-contained unit like that shown in FIGS. 1-5 and where the image on the face thereof is directed through a beam splitting mirror which also receives an image from hard copy when the apparatus is operating in a hard copy microform image-producing mode;

FIG. 8 shows the location of microfiche film card position sensors diagrammatically shown in FIG. 7; and FIG. 9 illustrates a microform image recording system like that shown in FIGS. 1-7 with specifically identified selectable data sources and various output devices for producing hard copy and making duplicate microfiche cards.

DESCRIPTION OF EXEMPLARY FORM OF INVENTION

Figure 7:
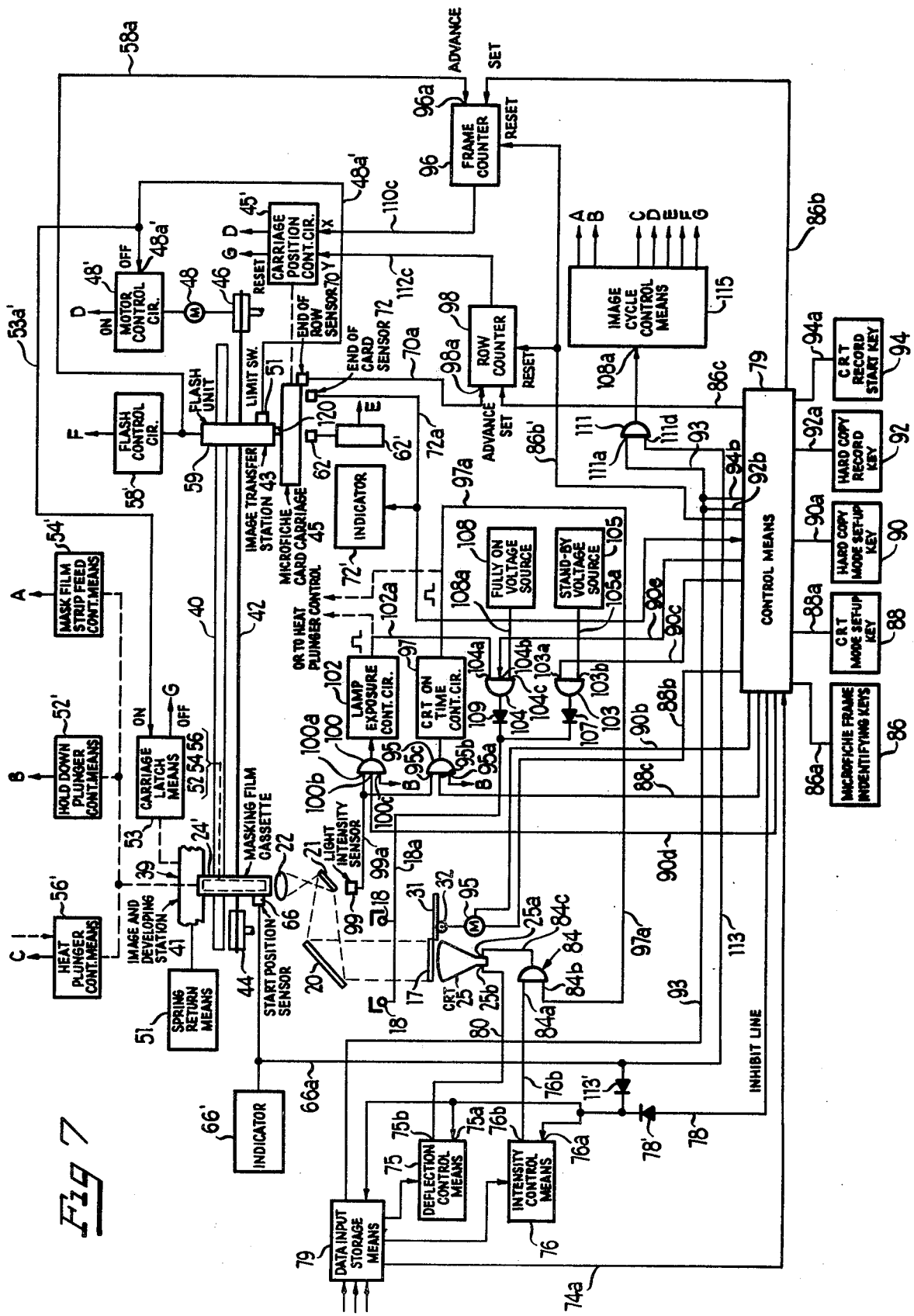
FIG. 7 is a detailed block diagram showing how the preferred form of the invention of FIG. 1 records on any selected frame or frames of a microfiche film card either images on the face of the cathode ray tube which may be automatically operated from signals directed from a computer or the images produced by light reflecting off of hard copy.

The apparatus illustrated in FIG. 1 comprises a self-contained microform image-producing unit 10 adapted to be mounted upon the top 15a of a cabinet 15. The self-contained unit 10 includes a housing 11 extending upwardly from a support base 11a which rests upon the cabinet top 15a. The housing 11 has at one end thereof a raised hood-forming portion 19 spaced above a white opaque platform 17 at the top of the support base which platform is adapted to receive hard copy to be micro-imaged. The hood 19 defines access openings 23a, 23b, and 23c respectively at the front, rear and one side of the housing 11 through which openings the operator may pass hard copy which is to be placed upon the platform 17. The platform 17 preferably forms a co-planar extension of the surrounding upper surfaces 11a' of the support base 11a of the self-contained unit 10 so that the hard copy much larger than the size of the platform 17 can be easily positioned over the image field defined by the platform 17. Projection lamps 18 supported upon the inside of hood-forming walls like 19a, 19b and 19c direct light down upon the hard copy placed on the platform. The lamps 18 may be fluorescent lamps which may be controlled in a manner like that disclosed in FIG. 2 of U.S. Pat. No. 4,158,253, granted June 19, 1979. The light reflected upward by the hard copy passes through an image-reducing projection system which may comprise mirrors 20 and 21 (FIG. 4) which direct a reduced image through a lens 22 and upon a light sensitive film 24, preferably a mask-forming film made of dry silver or other material, where the light-produced image thereon is developed by application of heat. The apparatus so far described is similar to that disclosed in said U.S. Pat. No. 4,123,157. However, the self-contained microform image-producing unit 10 is different from the apparatus disclosed in this patent, among other ways, in that the platform 17 is designed to accommodate the use and presence of an upwardly facing cathode ray tube 25 mounted below an opening 26 (FIG. 3) in the cabinet top 15a. The dimensions of opening 26 and the face 25a of the cathode ray tube face encompasses an area about equal to the largest area of hard copy which can be accommodated by the microform image-producing apparatus. Electrical connection between the cathode ray tube 25 and control circuitry within the self-contained unit 10 is directly or indirectly made through a connecting cable 27 or the like which extends between the cabinet 15 and the self-contained unit 10.

The hard copy receiving platform 17 differs from the corresponding platform contained in the apparatus disclosed in U.S. Pat. No. 4,123,157 in that the platform 17 is designed to permit an image appearing upon the face 25a of the cathode ray tube 25 to enter the same image-reducing projection system used for the hard copy. To this end, while the hard copy-receiving platform 17 may be made transparent to permit the passage therethrough of an image on the face of the cathode ray tube 25, to enable the best images to be made upon a sheet of hard copy which has some appreciable degree of transparency, it is preferred that the platform 17 be white and opaque. When it is desired to record an image on the face 25a of the cathode ray tube 25, the platform 17 is removed from the area encompassed by the face of the cathode ray tube. For example, as shown in FIG. 2, the platform 17 removably fits within a recess 28 in the top 11a' of the support base 11a and a finger-receiving groove 29 is provided for enabling an edge of the platform 17 to be grasped to remove the same from the recess 28. However, in the most preferred form of the invention shown in FIG. 2, a rack 31 is attached to the platform which is mounted in a horizontal guideway in the support base 11a for sliding movement between a position over the cabinet top opening 26 and a position to one side thereof where the opening is completely exposed. The rack 31 is driven by a pinion gear 32 coupled to a suitable motor (not shown) which is energized when a microform record of the face of the cathode ray tube is to be produced.

To provide for maximum clarity and resolution of the microform image on the face of the cathode ray tube 25, it is preferred that ambient light surrounding the equipment involved be shielded to a substantial degree from the face 25a of the cathode ray tube 25. In the exemplary form of the invention shown in FIG. 1, this is accomplished by light shields in the form of roll-up shade units 38a, 38b and 38c, respectively mounted in positions in the hood 19 where they can be dropped either manually or automatically by machine driven means into a position where they cover the access openings 23a, 23b and 23c. In the form of the invention illustrated, some small amount of light can still gain access to the region of the cathode ray tube face 25a through small openings between the hood 19 and the housing 11 on the inner side of the hood, but this small amount of light will not normally adversely affect to any substantial degree the clarity of the image produced by the equipment illustrated.

The self-contained microform image-producing unit 10 is provided with a control panel 32 having various manually operable controls like those to be described in connection with the functional block diagram of FIG. 7. This control panel may include, for example, microfiche frame identifying keys which when depressed will effect movement of a selected frame of a microfiche film card upon which the ultimate image is to be formed into position for receiving an image. Also, it may have CRT mode setup and hard copy mode setup keys and hard copy and CRT record keys respectively for setting up the recording system and effecting the recording of the hard copy or cathode ray tube image on the microfiche film card.

While it is preferred that the cathode ray tube 25 be positioned immediately below the platform 17, the equipment can be modified so as to be similar to that shown in FIG. 6 where the cathode ray tube 25 is mounted on the outer side of a mirror 20' which is a beam splitting mirror, where the inner surface 20a' thereof reflects the image directed thereto from hard copy placed upon the platform 17 toward the other mirror 21, and where the mirror transmits the image on the face of the cathode ray tube 25 directed upon the outer surface 20b' of mirror 20' through the mirror and upon the other mirror 21. This form of the invention is decidedly not preferred because significant amounts of light on the face of the cathode ray tube 25 are lost by reflection, whereas in the form of the invention shown in FIGS. 1 through 5 substantially all of the light on the face of the cathode ray tube is directed into the image-reducing projection system.

The splitting up of the equipment into a self-contained unit 10 and cathode ray tube carrying cabinet 15 has the advantage that the self-contained unit 10 is more compact and much of the same can be standardized and sold at a lower cost for use only for hard copy record producing purposes.

While the control circuit details of the exemplary preferred form of the invention being described can vary widely, it may have the circuit logic and other details shown in FIG. 7, to which reference should now be made. FIG. 7 shows the invention applied to an apparatus for producing microform records similar in many respects to that shown in said U.S. Pat. No. 4,123,157. Accordingly, such apparatus which is contained within the housing 11 includes, in addition to the mirrors 20-21 and lens 22, a masking film cassette and carriage assembly generally indicated by reference numeral 39. The assembly 39 includes a cassette 24' which may be identical to that disclosed in the latter patent, and so includes a supply and a motor-driven take-up reel for holding and positioning a roll of dry silver mask-forming film, which is periodically advanced in step-by-step fashion to an imaging position within the cassette. Also, the cassette carries a hold-down plunger and a heat developing plunger which are respectively brought down in succession upon the portion of the mask-forming film in position to press the same into a fixed plane as described in the latter patent, to carry out exposure and developing operations to produce a transparency for each image projected thereon. The hold-down plunger, heat developing plunger and mask-forming film supply and take up reels are respectively diagrammatically indicated by reference numerals 52, 54 and 56 respectively extending to the dotted box shown in the interior of the cassette shown in FIG. 7. The control means therefor respectively are diagrammatically illustrated in box form in FIG. 7 outside of the cassette (while they are obviously within the same) and identified respectively by reference numerals 52', 54' and 56'. When these control means receive operating control voltages on control lines identified by reference characters B, C and A respectively, the hold-down plunger will be depressed momentarily for a period equal to the largest expected exposure time, the heat developing plunger will be depressed for a proper period for developing the film and the motor controlling the positioning of the mask-forming film will advance the film an increment to bring a new area of the film into an imaging position.

The mask-forming film cassette and carriage assembly 39 is guided for movement upon one or more guide rods 40. The assembly 39 is initially positioned as shown in FIG. 7 opposite an imaging and developing station 41. The assembly 39 may be spring urged into this position by spring return means 51. The assembly is moved against the return form of this spring return means by, for example, a pulley drive system including a chain or cord 42 connected to the assembly 39 and extending around pulley wheels 44 and 46. The pulley wheel 46 is driven by a motor 48 controlled by a motor control circuit 48' which becomes energized when an input line D thereof receives a start pulse and becomes de-energized when an input line 48a' thereof receives an "off" voltage generated by a limit switch 51 operated when the cassette 24' is moved to an image transfer station 43. The input line 48a' is also connected to a carriage latch input line 53a' extending to an "on" terminal of a carriage latch means 53 which latches the assembly 39 into position when it strikes the limit switch 51. When the cassette 24' is opposite transfer station 43 the image previously formed on the mask-forming film is transferred to the proper frame of a microfiche film card 42a' shown in FIG. 8 supported on a carriage 45. The carriage latch means 53 becomes de-energized to release the assembly 39 so it can return under the force of the spring return means 51 to the imaging and developing station 41 when the carriage latch means 53 receives an "off" pulse on an input line G. The position of the microfilm card carriage 45 is controlled by a carriage position control circuit 45' which receives signals from signal sources to be described. Mounted beneath the microfiche film card carriage 45 is a plunger 62 controlled by a solenoid 62' which, when energized momentarily, will bring the plunger 62 against the selected frame of the microfiche film card in position for imaging to press the same against the mask-forming film, in turn, braced by a suitable backing as described in said latter patent. When the plunger 62 is thus positioned, a flash control circuit 58' will operate a xenon flash unit 58 or the like to provide a flash of light to transfer the image on the mask-forming film 24 to the frame of the microfiche film card on the carriage 45 in position for imaging.

There is at the image and developing station 41 a start position sensor 66 which is operated when the cassette 24' is opposite the imaging and developing station 41. At the image transfer station 43 there is provided an end of row sensor 70 which generates a control signal when the carriage 45 positions the microfiche film card so that the last frame in any row of frames thereof is in position for imaging, and an end of card sensor 72 which generates a control signal when the carriage 45 positions the microfiche film card so that the last frame of the last row of frames thereof is in position for imaging (See FIG. 8). An output line 72a of the end of card sensor 72 operates an indicator 72' to indicate to the operator that a new microfiche film card should be placed upon the carriage.

As previously indicated, the microform image-producing apparatus shown forms microform images on various frames of the microfiche film card from either hard copy placed upon platform 17 or from the image produced on the face 25a of the cathode ray tube 25 preferably positioned immediately below the platform 17. The means for feeding images sequentially to a cathode ray tube from various data sources is well known in the art, (although the prior art has not incorporated the same into a microform imaging system as shown and described). These data sources feed this information one data page at a time either automatically or under manual control. In either event, these signal sources feed data to be converted into alpha-numeric or picture or curve producing form first to an input data readout storage means 74. The data storage means 74, in turn, is connected to cathode ray tube beam means 76 which respectively control the position and intensity of an electric beam directed toward the screen on the face of the cathode ray tube 25. Suffice it to say, the deflection control means 75 and intensity control means 76 have output lines 75b and 76b upon which the proper deflection and intensity control signals appear, when no inhibiting signals are fed to inhibit input terminals 75a and 76a respectively of the deflection and intensity control means. The output line 76b of the intensity control means is shown coupled to an input terminal 84a of an "AND" gate 84 whose output line 84c connects to the terminal of the cathode ray tube base controlling beam intensity. The rapidly changing signals on the output line 76b can pass through the "AND" gate 84 only when enable signals appear on the other input terminal 84b thereof. The connections to these other input terminals will be hereinafter described.

When the microfiche frame identifying keys 86 are depressed, or when microfiche frame address signals are generated by data storage means 74, groups of control lines collectively identified by 86a or 74a extending to control means 79 effect the generation of control signals on control lines 86b and 86c respectively extending to the set inputs of frame and row counters 96 and 98, which cause entry therein of the microfiche film card frame and row identifying indicia of the keys depressed. However, first signals fed from the control means 79 on control line 86b' reset the frame and row counters by the connection of reset line 86b' to the reset inputs of these counters. The frame and row counters 96 and 98 are respectively connected to the X and Y inputs of the carriage position control circuit 45' which effects the movement of the microfiche card carriage 45 into a position to bring the selected frame into image transferring position below the flash unit 58 when the circuit 45' receives a signal from a D input line. The frame counter 96 has an advance input terminal 96a to which extends line 58a connected to the output of the flash control circuit 58, so that the frame number stored in the frame counter increases by one digit automatically each time a new image is recorded on the microfiche film card 45a'. The frame counter resets to number 1 when the last frame in any row receives an image thereon.

Similarly, the row counter 98 has an advance input terminal 98a to which extends a control line 70a connected to the end of row sensor 70. Accordingly, each time the last frame in a row is imaged, the end of the row sensor 70 will be operated to advance the indicia in the row counter one row position, so that the next recording operation will take place in the first frame of the next row, unless a different frame number is set-up by the microfiche frame identifying keys 86.

When the CRT record mode set-up key 88 is operated, a control line 88a extending to the control means 79 effects the generation of a signal on a number of control lines like control line 88b extending to a motor 95 to operate the same to rotate pinion gear 32 a sufficient distance to move the platform 17 from a position overlying the cathode ray tube 25 to a position spaced to one side thereof, so that the image on the face of the cathode ray tube will be directed into the projection system comprising the mirrors 20-21 and the lens 22. An enable signal also then appears on a control line 88c extending to the input terminal 95b of a "AND" gate 95 having another input termial 95c connected to output line 99a of the light intensity sensor 99, which senses the background light intensity of the image directed upon the mirror 21. The "AND" gate 95 also has an input terminal 95a connected to an input line B which receives a control signal at the appropriate time to effect the transfer of the signal generated by the light intensity sensor 99 to an input terminal of a CRT on-time control circuit 97 which generates a pulse having a width inversely proportional to the intensity of the light detected by the light intensity sensor 99. The control pulse appears on an output line 97a of on-time control circuit 97 which line is connected to the input terminal 84b of the "AND" gate 84 coupled also to the image control means 76, so that the intensity control terminal of the cathode ray tube 25 will receive sequences of the image-forming signals for a sufficient time period to provide the proper exposure of the mask-forming film 24. (Instead of using the output of control circuit 97 to control the length of time the data page image is present on the screen of the cathode ray tube, this output can control instead the temperature or down time of the heat plunger to control the developing conditions of the mask-forming film.)

The output line 99a of the light intensity sensor 99 is also connected to an input terminal 100a of an "AND" gate 100 whose output line exceeds to a lamp exposure control circuit 102 which generates a pulse having a width inversely proportional to the intensity of the light detected by the light intensity sensor 99. However, the width of the pulse produced by the lamp exposure control circuit 102 will generally be different from the width of the pulse generated by the CRT on time control circuit 97 for a given light intensity striking the light intensity sensor 99 because these pulses control different light producing sources, namely the lamps 18 and the image on the face of cathode ray tube 25. Accordingly, when the hard copy mode set-up key 90 is operated, the control line 90a extending from the key 90 to the control means 79 will result in the generation of an enable signal on a control line 90d extending to the input terminal 100b of the "AND" gate 100 which permits the opening thereof by a timing signal on input line B which controls the on-time of the lamps 18. (However instead of using the output of lamp exposure control circuit 102 to control the on-time of lamp 18 the lamps can be turned on for a fixed period and this output can instead control the temperature as down time of the heat plunger to control the developing condition of the mask-forming film.)

However, as illustrated, the voltage sources for the lamps 18 include a standby voltage source 105 which provides only a low degree of energization of the lamps 18, so that no appreciable visible light is produced thereby (i.e. so that it cannot image the dry silver masking film), and a fully-on voltage source 108 which produces a voltage which will fully energize the lamps 18. The output voltages of the voltage sources 105 and 108 respectively are connected by lines 105a and 108a to input terminals 103b and 104c of "AND" gates 103 and 104, respectively. When the hard copy record mode set-up key 90 is depressed, enable signals appear on control lines 90c and 90e respectively extending to input terminals of "AND" gates 103 and 104 to enable the same to pass the voltages fed thereto from the respective voltage sources 105 and 108. Isolating rectifiers 107 and 109 respectively are connected between the outputs of the "AND" gates 103 and 104 and a common line 18a extending to the lamps 18.

It should be appreciated that one important feature of the invention is the use of a cathode ray tube image which is formed by backlighted areas surrounding dark data indicating areas so that the cathode ray tube image appears like a hard copy image. This permits the use of the same light intensity sensor 99 located to interrupt a corner portion of the image field which will always be a lighted portion. Also, such a cathode ray tube image permits data to be added onto the image produced on the microfiche card-forming film because the backlighted portion of the cathode ray tube image produces no modification of the originally opaque portion of this film. Also, it was unexpectedly found that the exposure time needed for a given light intensity on the screen of a cathode ray tube is substantially less when the alphanumeric or other data thereon are dark rather than lighted portions thereof. It is believed that this is due to the fact that the application of a narrow intensity turn-on voltage pulse to the intensity control terminal of a cathode ray tube to produce the small lighted areas does not have an instantaneous effect in bringing up the light intensity to a given desired value, and so the light intensity produced thereby gradually increases with time and so there is produced a much lower average light intensity than that produced by consistent voltage signals producing backlighted areas on the cathode ray tube screen. Also, if an attempt is made to increase the average intensity of small lighted data forming areas on the screen, the resolution of the image produced in adversely affected.

It is apparent that the logic of the circuit shown in FIG. 7 will prepare the recording system shown for a proper exposure of the mask-forming film 24 whether CRT or hard copy imaging is demanded by operation of the proper set-up and record keys.

Operation of the hard copy record mode set-up key 90 produces a signal on a control line 90a connected to control means 79 which generates a signal on a control line 90b to rotate the pinion gear 32 in a direction to return the platform 17 to a position to cover the face of the cathode ray tube 25 where hard copy can be supported thereon beneath the image-reduction projection system.

When the hard copy record mode setup key 90 is operated, a continuous inhibit signal appears on line 78 connected through an isolating diode 78' to the inhibit input terminals 74a, 75a and 76a of the buffer storage means 74, deflection control means 75 and intensity control means 76, until the CRT record start key 94 is operated, so that no signals are fed to the cathode ray tube 25 until the CRT record start key 94 is operated and the masking film cassette 24' is at the imaging and developing station 41.

When the CRT record start key 94 is depressed, the signal appearing on a line 94a extending from this key to the control means 79, as previously explained, results in the removal of an inhibit signal from inhibit line 78 so that computer stored data to be recorded on microfiche film card 45a' will be fed via a line 93 extending from the output of the computer data readout buffer storage means 74 and connected to the input terminal 111a of an "AND" gate 111, to provide a cycle start signal each time data for a new image on the face of cathode ray tube 25 is to be produced.

When the hard copy record key 92 is depressed, the signal appearing on the control line 92a extending to control means 79 initiates an enable signal on a control line 92b extending from the control means 79 to the input terminal 111a of "AND" gate 111. The "AND" gate 111 has a second input terminal 111b which is connected by line 113 to the start position sensor 66 which produces an enable signal for "AND" gate 111 when the masking film cassette is positioned at the imaging and developing station 41, and an inhibit signal at all other times coupled through insulating diode 113' to the inhibit input terminals 74a, 75a and 76a of the buffer storage means 74, deflection control means 75 and intensity control means 76. It is thus apparent that the "AND" gate 111 will receive an output when the masking film cassette is in a proper position and either the hard copy record key 92, or the CRT record start key 94 has been previously depressed and there is data in buffer storage means 74 to be recorded. The appearance of a signal at the output of "AND" gate 111 then is fed to the input 108 of an imaging cycle control means 115 which, when triggered into operation by a signal at input terminal 108a, results in the sequential appearance of control signals at appropriate times at the various output lines A, B, C, D, E, F and G leading to various parts of the circuit shown in FIG. 7.

The imaging cycle control means 115 may be any suitable timing unit which generates various control pulses on said output lines A-G, the alphabetic characters indicating the relative time the various control signals are initiated. Thus, first the image cycle control means 115 generates a control pulse on its output line A which extends to the mask film strip feed control means 54' to advance the mask-forming film so that an unimaged frame thereof is positioned for imaging. Next, the control means 115 generates a control signal on its output line B which line extends to the hold-down plunger control means 52' and the input terminals 95a and 100c controlling the feeding of the output of light intensity sensor 99 to lamp and CRT exposure control means 97 and 102. The control means 97 and 102 may be operable slightly after the initiation of the control signal on output line B, so that movement of the hold-down plunger against the mask-forming film 24 will be completed before exposure of the film is initiated. These control signals will last for the period necessary to complete the longest anticipated exposure.

Next, the image cycle control means 115 generates a control pulse on output line C which extends to the heat plunger control means 56' which moves a heated plunger against the exposure frame of the mask-forming film to develop the same. The image cycle control means 115 then generates a control pulse on output line D extending to the motor control circuit 48' which pulse initiates the energization of motor 8, and to the cycle control circuit 45' which then positions the microfiche card carriage 45 in accordance with the input signals fed to the "X" and "Y" inputs of the control circuit 45'. Next, the image cycle control means 115 generates a control pulse on output line E extending to the plunger solenoid 62' which moves plunger 62 against the frame of the microfiche film card 45a' in position for imaging at the image transfer station 43. Manifestly, the control pulse on output line E is not initiated until the microfiche film cassette 24' has reached the limit switch 51 at the image transfer station 43 and the microfiche card carriage 45 has positioned the selected microfiche card frame in an imaging position.

Next, the image cycle control means 115 generates a pulse on its output line F which extends to the flash control circuit 58' to initiate energization of the flash unit 59 which then images the frame of the microfiche film card in position for imaging through the previously imaged frame of the mask-forming film 24. The image cycle control means 115 then generates a carriage return pulse on output line G which is shown extending to the carriage position control circuit 45' to release the carriage to return to its initial or home position as in the case of the carriage positioning means in said U.S. Pat. No. 4,123,157. The output line G also extends to the "off" terminal of the carriage latch means 53 so that the carriage latch is released over the spring return means 51 which can return the microfilm cassette and carriage assembly 39 to a position where the cassette is adjacent to the start position 66 at the image and developing station 41. When the cassette 24' is opposite the start position sensor 66, an associated indicator 66' becomes energized to indicate that a new imaging operation may take place.

While not shown in FIG. 7, the apparatus of the present invention most advantageously carries out additional functions also performed by the apparatus disclosed in said U.S. Pat. No. 4,123,157 to enable the user to add information on unimaged portions of a partially imaged frame of the microfiche card-forming film 45a'. Thus, the keyboard 32 will include additional controls for effecting such an add-on operation which requires that the microfiche card carriage be moved into a position where a projection lamp will project a selected frame of the microfiche card-forming film onto the platform 17 so that a overlay sheet of hard copy can be positioned upon still unimaged portions of the selected frame. Then, an imaging operation of this overlay sheet is effected in the manner described to transfer data on the overlay sheet of hard copy onto a previously unimaged portion of the mask-forming film and then to transfer this image onto the microfiche card frame involved. As previously indicated, to effect this add-on capability from data images originally made from cathode ray tube screen images, the data formed on the face of the cathode ray tube 25 must be formed by dark backlighted areas thereof duplicating the appearance of hard copy. While hard copy-duplicating images may have been previously displayed on the screens of cathode ray tubes, it is not believed that such images have been used in the formation of microform images or for the purpose of giving a microform recording system an add-on capability. It should be noted that because a microfilm like dry silver film is affected by the background lighted portions of the hard copy image, there can be no data added thereto once it is imaged.

The self-contained microform image-producing unit 10 may be designed to have other capabilities now to be described. Such a modified unit 10' referred to as a microfiche imaging and readout unit is shown in FIG. 9, to which reference should now be made. Thus, as illustrated, the keyboard 32 may be provided with other controls identified generally by reference number 120. These additional controls call for automatic production of hard copy from the data recorded on any selected frame of the microfiche card-forming film 45a' and the formation of microfiche card duplicates, where desired. When a hard copy producing key and microfiche frame identifying keys are pressed, a control lens 120a extending to the control means 79' results in a control signal fed on a control line 120b extending to the microfiche imaging and readout unit 10' which effects the movement of the microfiche card-forming film carriage 45 to a position opposite a projection station where the image of the selected frame will be projected upon a printer unit 122 which could be a xerographic unit well known in the art. To this end, FIG. 9 shows a control line 120e extending from the control means 79' to the unit 122 so that the unit will form hard copy from the image projected on a portion thereof from the microfiche imaging and readout unit 10'.

When a duplicate microfiche card producing key and a copy number key are depressed control signals appearing on line 120a' extending to the control means 79' will result in a control signal fed over a control line 120d to the microfiche imaging and readout unit 10' which will move the microfiche film-forming carriage 45 into a position where all of the frames on the microfiche card-forming film are projected onto a portion of a microfiche duplicator means 124 where the selected number of microfiche duplicating cards are produced automatically thereby.

FIG. 9 also shows various types of data sources which can be selectively fed to the data storage means 74. Thus, as there shown, a local computer data source 126, a video camera signal source 128 or other miscellaneous local data sources 130 can be selectively connected to the data storage means 74 by operation of a suitable data source selection key. To this end, control lines identified by reference numeral 120g extend from the control means 79', which in turn energize a corresponding switch 126a, 128a or 130a to connect the selected data source to the data storage means 74. The video camera signal source 128 may be operated from signal sources fed thereto on an input line 132a extending to video medical equipment 132 which may be C.A.T. scan system, fluoroscopy, ultra sound, gamma camera, or other patient monitoring equipment well known in the art. Similarly, the video camera signal source 128 may be fed from input signals on an input line 130a' extending from X-ray, or patient chart record data sources identified by reference numeral 130'.

FIG. 9 also shows a telephone network 134 to which remote computer data source 136, teletype data source 138, facsimile data source 140 or medical data instrumentation source 142 can be selectively connected to the telephone network by operation of suitable keys to generate suitable telephone network control signals on an output line 120f extending from control means 79' to the telephone network 134.

It is thus apparent that applicants have provided the highly unique and advantageous microform recording apparatus for computer stored data and, in the most preferred form of the invention, for hard copy data as well.

It should be understood that numerous modifications may be made in the most preferred form of the invention without deviating from the broader aspects thereof. For example, while the use of a non-archival mask-forming film like dry silver is most advantageously used to form the image produced by the projection system and this image is then transferred to an add-on dry process archival film like the dispersion film disclosed in said U.S. Pat. Nos. 3,966,317 and 4,123,157, the reduced projected image may be transferred directly to the ultimate microfilm to be used as the permanent final microform recording medium.

I claim:

1. An apparatus for producing microform records from light reflecting hard copy wherein a light image reflected from the hard copy is reduced to microimaged size and applied at a film imaging station to film means which is photosensitive to an image by the light reflecting hard copy, said apparatus comprising a hard copy-receiving station including a platform occupying a given area which platform is to receive hard copy placed thereon, said platform being light colored and opaque to duplicate the light background of hard copy, image-reducing projection means for directing upon said film means a micro-image of the light reflected image from hard copy placed on said platform, a cathode ray tube on the side of said given area remote from said projection means, means for directing towards said area and into said projection means the light image on the screen of said cathode ray tube upon which is to appear a page of data to be recorded on a microfilm frame, and platform support means for withdrawing said platform from said area when it is desired to project the image on the cathode ray tube face upon said film means so that the image on the screen thereof is directed through the opening previously occupied by said platform.

2. The apparatus of claim 1 wherein said platform withdrawing means includes manually operable means and means for automatically moving the platform away from said given area in response to operation of said manually operable means.

3. In an apparatus for producing microform records from light reflecting hard copy wherein a light image reflected from the hard copy is reduced to microimaged size and applied at a film imaging station to film means which is photosensitive to an image by the light reflecting hard copy, said apparatus including a hard copy-receiving station including a platform movable into and out of a given area, which platform is to receive hard copy placed thereon, image-reducing projection means for directing upon said film means a microimage of the light reflected image from hard copy placed on said platform, and means on the side of said area remote from said projection means for directing towards said area and into said projection means when said platform is removed therefrom the light image on the screen of a cathode ray tube upon which is to appear a page of data to be recorded on a microfilm frame, the improvement wherein said film imaging station, platform and projection means form part of a self-contained unit, and said means for directing the image on the face of said cathode ray tube toward said given area is mounted below the upper face of a raised surface upon which said self-contained unit can be placed when it is desired that the cathode ray tube image as well as a hard copy image be selectively recorded upon said film means.

4. In an apparatus for producing microform records from light reflecting hard copy wherein a light image reflected from the hard copy is reduced to microimaged size and applied at a film imaging station to film means which is photosensitive to an image by the light reflecting hard copy, said apparatus including a hard copy-receiving station including a platform movable into and out of a given area, which platform is to receive hard copy placed thereon, image-reducing projection means for directing upon said film means a microimage of the light reflected image from hard copy placed on said platform, and means on the side of said area remote from said projection means for directing towards said area and into said projection means when said platform is removed therefrom the light image on the screen of a cathode ray tube upon which is to appear a page of data to be recorded in a microfilm frame, the improvement wherein said apparatus includes light source means for directing light upon hard copy placed upon said platform when in said given area, and exposure control means responsive to the background intensity of the image field projected by either said hard copy or said cathode ray tube projected image for controlling the length of time the film means is exposed to the image involved.

5. The apparatus of claims 1, 2, 3 or 4 wherein said platform is exposed on at least one side thereof to the exterior of the apparatus so that the user thereof may readily place hard copy on said platform, and there is provided on said one side of said platform means for selectively moving a light shield thereat which blocks ambient light from said given area when it is desired to project an image on the face of the cathode ray tube into said projection means.

6. In an apparatus for producing microform records from light reflecting hard copy wherein a light image reflected from the hard copy is reduced to micro-imaged size and applied at a film imaging station to film means which is photosensitive to an image by the light reflecting hard copy, said apparatus including a hard copy-receiving station including a platform occupying a given area, which platform is to receive hard copy placed thereon, image-reducing projection means for directing upon said film means a micro-image of the light reflected image from hard copy placed on said platform, and means for directing into said projection means the light image on the screen of a cathode ray tube upon which is to appear a page of data to be recorded on a microfilm frame, the improvement wherein there is provided light intensity sensor means responsive to the background intensity of the image field projected from said hard copy or from the image on the screen of said cathode ray tube, first control means responsive only to the output of said light intensity sensor means when the image projected into said image-reducing projecting means is from the light reflected from said hard copy by controlling the quality of the image produced in said film means, and second control means responsive only to the output of said light intensity sensor means when the image projected into said image-reducing projection means is from said display device screen by controlling the quality of the image produced in said film means.

7. The apparatus of claim 6 wherein said first and second control means respectively control the time light is reflected from said hard copy and an image appears on said cathode ray tube screen.

8. The apparatus of claim 6 wherein said first and second control means respectively regulate the developing conditions of said film means.

9. The apparatus of claim 6 wherein the image produced on the screen of said cathode ray tube are dark alpha-numeric characters formed by background lighted portions of said screen surrounding said alpha-numeric characters, said control means being light sensitive means mounted in the image field directed into said image-reducing projection means and positioned so as to intercept always back-lighted areas on the alpha-numeric characters on said cathode ray screen or tube in the image field of the light reflected from said hard copy.

10. In an apparatus for producing microform records from light reflecting hard copy wherein a light image reflected from the hard copy is reduced to micro-imaged size and applied at a film imaging station to film means which is photosensitive to an image produced by light reflecting from said hard copy, said apparatus including a hard copy-receiving station including a platform which is to receive hard copy placed thereon, image-reducing projection means for directing on the film means a micro-image of the light reflected image from hard copy placed on said platform, display means for producing light images, image directing means for directing said light images of said display means into said projecting means, light producing means for directing light upon hard copy placed on said platform so that the reflected image on the hard copy is directed into said image-reducing projection means, and first and second manually operable means for respectively selectively initiating the energization of said light producing means or the operation of said display means, the improvement comprising light intensity sensor means responsive to the background intensity of the image field projected from said hard copy or from said display means, first control means responsive only to the output of said intensity sensor means when the image projected into said image-reducing projecting means is from the light reflected from said hard copy by controlling the quality of the image produced in said film, and second control means responsive only to the output of said intensity sensor means when the image projected into said image-reducing projection means is from said display means by controlling the quality of the image produced in said film means, said first and second control means being operable to control the exposure time of said film means depending upon whether said first or second manually operable means is operated.

11. The apparatus of claim 10 wherein said first and second control means respectively control the time light is reflected from said hard copy and an image is produced by said display means.

12. The apparatus of claim 10 wherein said first and second control means respectively regulate the developing conditions of said film means.

13. A microform record producing system for producing microform records from light reflecting hard copy wherein a light image reflected from the hard copy is reduced to micro-imaged size and applied at a film imaging station to film means which is photosensitive to an image produced by light reflecting from said hard copy, said system including a hard copy-receiving station including a platform which is to receive hard copy placed thereon, image-reducing projection means for directing on the film means a reduced micro-image of the light reflected image from hard copy placed on said platform, display means for producing light images, image directing means for directing said light images of said display means into said projecting means, light-producing means for directing light upon hard copy placed on said platform so that the reflected image on the hard copy is directed into said image-reducing projection means, and manually operable means for selectively initiating the energization of said light producing means or the operation of said display means, the improvement wherein said image directing means directs light images of said display means into said image-reducing projection means through the area which is occupied by said hard copy-receiving platform when a hard copy image is to be recorded, said platform being a light color and opaque, and said platform being movable into and away from said area where selectively either a hard copy image or said screen image is directed into said image-reducing projection means.

14. The apparatus of claim 10 or 13 wherein there is provided means for guiding the platform for movement between a position where it is said area in said alignment with said image-reducing projection means and another position where it is removed from such area where the display device screen image can be directed into said image-reducing projecting means, and said platform includes means for automatically moving the platform into one or the other of said positions depending upon whether said first or second manually operable means is operated.

15. In an apparatus for producing microform records from light reflecting hard copy wherein a light image reflected from the hard copy is reduced to micro-imaged size and applied at a film imaging station to film means which is photosensitive to an image produced by light reflecting from said hard copy, said apparatus including a hard copy-receiving station including a platform which is to receive hard copy placed thereon, and image-reducing projection means for directing on the film means a micro-image of the light reflected image from hard copy placed on said platform, display means for producing light images, image directing means for directing said light images of said display means into said projecting means, light-producing means for directing light upon hard copy placed on said platform so that the reflected image on the hard copy is directed into said projection means, and first and second manually operable means for respectively selectively initiating the energization of said light producing means or the operation of said display means, the improvement wherein said display means comprised an electrical device including a screen, means for feeding data signals to the electrical device to form on said screen a light image defining dark alpha-numeric characters formed by background lighted portions surrounding said alpha-numeric characters so that the image appears like hard copy, and light intensity sensor means including light sensitive means mounted in the image field directed into said image-reducing projection means and positioned so as to intercept the always background lighted portions surrounding the alpha-numeric characters on said light image for said display means or of the light reflected from said hard copy.

16. In an apparatus for producing microform records from light reflecting hard copy wherein a light image reflected from the hard copy is reduced to micro-imaged size and applied at a film imaging station to film means which is photosensitive to an image produced by light reflecting from said hard copy, said apparatus including a hard copy-receiving station including a platform which is to receive hard copy placed thereon, image-reducing projection means for directing on the film means a micro-image of the light reflected image from hard copy placed on said platform, display means for producing light images, image directing means for directing said light images of said display means into said projecting means, light producing means for directing light upon hard copy placed on said platform so that the reflected image on the hard copy is directed into said image-reducing projection means, and first and second manually operable means for respectively selectively initiating the energization of said light producing means or the operation of said display means, the improvement wherein said hard copy receiving station and image-reducing projection means form part of a self-contained unit, and said means for directing the image of said display means toward said given area is mounted in a support unit having a raised support surface through which said image is directed at a given point thereof, said self-contained unit being mountable on said surface with said hard copy-receiving platform located above said point of said surface.

17. The apparatus of claim 10, 13 or 16 wherein said platform is exposed on at least one side thereof to the exterior of the apparatus so that the user thereof may readily place hard copy on said platform, and there is provided on said one side of said platform means for selectively moving a light shield thereat which blocks ambient light from said given area when it is desired to project an image on the display device screen into said projection means.

18. A microform record producing system for producing microform records from light reflecting hard copy wherein a light image reflected from the hard copy is reduced to micro-imaged size and applied at a film imaging station to film means which is photosensitive to an image produced by light reflecting from said hard copy, said system comprising a hard copy-receiving station including a platform which is to receive hard copy placed thereon, image-reducing projection means for directing on the film means a reduced micro-image of the light reflected image from hard copy placed on said platform, film means including a hard copy reflected light sensitive mask-forming film upon which said reduced image is first formed, image transfer means for transferring the image on said mask-forming film upon a selected frame of a less light sensitive second film having other desirable properties, display means for producing light images successively representing successive pages of data, image directing means for directing said light images of said display means into said projection means, light producing means for directing light upon hard copy placed on said platform so that the reflected image on the hard copy is directed into said image-reducing projection means, and manually operable means for selectively initiating the energization of said light producing means or the operation of said display means.

19. The microform record producing systems of claim 18 wherein there is further provided means for automatically moving a new section of said mask-forming film into position to receive a new image on the display means after an image is formed thereon and a new frame of said second film into position to receive a new transferred image so that successive pages of data are automatically recorded on said mask-forming film and said second film without human intervention.

20. The apparatus of claim 15, wherein said control means controls the length of time the image appears on said display means for providing a proper exposure of the film means.

21. The apparatus of claim 10, 13, 15, 16 or 20 wherein said display means is a cathode ray tube and the cathode ray tube screen image directed into said image-reduction projection means approximates the size of said hard copy to be placed on said platform.

22. A microform record producing system for producing microform records from light reflecting hard copy wherein a light image reflected from the hard copy is reduced to micro-imaged size and applied at a film imaging station to film means which is photosensitive to an image produced by light reflecting from said hard copy, said system comprising a hard copy-receiving station including a platform which is to receive hard copy placed thereon, image-reduction projection means for directing on the film means a reduced micro-image of the light reflected image from hard copy placed on said platform, film means including a first relatively high light sensitive film upon which the reduced image is initially projected and wherein the light exposed areas thereof are opaque and the unexposed areas thereof are transparent, a second permanent record less light sensitive film, means for projecting radiant energy through said first film onto said permanent record film, the exposed areas of said permanent record film becoming transparent, and wherein the unexposed areas are opaque, light-producing means for directing light upon hard copy placed on said platform so that the reflected image on the hard copy is directed into said image-reducing projection means, a cathode ray tube for producing light images, means for feeding data signals to the cathode ray tube to produce on the screen thereof dark alpha-numeric characters formed by background lighted portions of said screen surrounding said alpha-numeric characters, image directing means for directing the said light images on the cathode ray tube screen into said projecting means, and manually operable means for selectively initiating the energization of said light producing means or the operation of said display means, so that the light image on the screen appears like a sheet of ordinary hard copy.

23. The apparatus of claim 22 wherein said permanent record film is initially opaque and is rendered transparent by said radiant energy without affecting the opaque areas thereof which then can be subsequently imaged.

24. In combination with an apparatus for producing microform records of data, said apparatus comprising a display device having a screen upon which is produced light image-forming areas in response to data image-forming signals fed to input terminals thereof, means for feeding data signals to said display device input terminals sequentially to form on said screen different images representing different pages of recorded data to be recorded on spaced frames of a microfilm, image-reducing projection means which receives the image formed on said screen and reduces the same to a relatively small size, means for producing microform records from the reduced image produced by said image-reducing projection means comprising film means including a permanent record film upon which said pages of data are to be recorded in small spaced frame areas thereof, and means for recording the reduced image produced by said image-reducing projection means on a selected frame area of said permanent record film, the improvement wherein said film means includes a second film more sensitive to the light image of said display device screen and upon which the reduced image is initially projected, and there is provided image-transfer means for transferring the image in said second film to said permanent record film.

25. The combination of claim 24 wherein the display device screen image produces opaque and transparent areas on said second film respectively from the light and dark areas of said image and said image transferred from said second film to said permanent record film produces respectively opaque and transparent areas on said second film respectively from the opaque and transparent areas on said second film.

26. In combination with an apparatus for producing microform records of data, said apparatus comprising a cathode ray tube having a screen upon which is produced light image-forming areas in response to data image-forming signals fed to input terminals thereof, means for feeding data signals to said display device input terminals sequentially to form on said screen different images representing different pages of recorded data to be recorded on spaced frames of a microfilm, image-reducing projection means which receives the image formed on said screen and reduces the same to a relatively small size, and means for producing microform records from the reduced image produced by said image-reducing projection means comprising film means including a permanent record film upon which said pages of data are to be recorded in small spaced frame areas thereof, and means for recording the reduced image produced by said image-reducing projection means on a selected frame area of said permanent film, the improvement wherein said permanent record film is initially opaque and is rendered transparent by radiant energy means for providing a reduced radiant energy image of only the dark areas of the image produced on said cathode ray tube screen and projecting the same on said permanent record film, and said data image-forming signals fed to said cathode ray tube input terminal producing backlighted areas framing dark data-forming areas thereon.

27. The apparatus of claim 7 wherein there is provided fluorescent lamp means or the like for directing light down upon said hard copy when a record of said hard copy is to be provided, standby voltage means for providing a low degree of energization of said fluorescent lamp means or the like so that said film means is not imaged thereby, and said first control means effecting the connection of the normal voltage to said fluorescent lamp or the like means for the precise period required for proper exposure of said film means in accordance with the output of said light intensity sensor means.

* * * * *